United States Patent Office 2,922,771
Patented Jan. 26, 1960

2,922,771

COMPOSITION OF MATTER COMPRISING POLY-STYRENE AND CARBOXYALKYLATED POLY-AMINES

Myron A. Coler, Scarsdale, and Arnold S. Louis, Riverdale, N.Y.

No Drawing. Application March 30, 1956
Serial No. 574,955

4 Claims. (Cl. 260—31.2)

This invention relates to improved synthetic resin molding compositions and, in particular, to such molding materials which avoid the highly undesirable effects of electrostatic charge build-up during the molding operation, and method of making same.

It has been found that the process of molding certain synthetic resins causes the generation of high electrostatic charges. This evidences itself frequently by the formation of "crow's-feet," "fern-like" and "zig-zag" patterns through the attraction of fine dust particles from the atmosphere. Such patterns are sometimes erroneously interpreted as being molding flaws.

The literature discloses many additives for rendering synthetic resins destaticized. Many of such additives depend on the property of deliquescence to cause the article to be wetted by moisture from the air. The moisture renders the surfaces of the article sufficiently conductive to prevent the further accumulation of electrostatic charges. Molding operations are normally carried out at temperatures substantially in excess of the boiling point of water and, therefore, as molded, the molded article is relatively moisture-free and thus subject to the accumulation of electrostatic charges at the time of molding.

Still other prior known additives which are inherently destaticizing agents tend to undesirably affect the physical properties of the plastic. For example, a lowering of the heat distortion point may occur. There may also be a change in color, gloss, hardness or water absorption characteristics, or blemishes may result from decomposition of additives or evaporation of low boiling fractions. The resulting product may also become toxic if the additive is in itself toxic.

Our invention, disclosed hereinafter, provides a plastic composition which avoids the disadvantages of acquiring electrostatic charges and, in particular, which is not susceptible to electrostatic charging during the molding operation or upon release from the mold.

This invention does not depend on deliquescent action and, therefore, produces results substantially independent of humidity. This advantage of the invention is important in the elimination of the tendency for dust patterns to form on freshly molded plastic articles.

We have found that selected carboxyalkylated alkylene polyamines may be incorporated into synthetic molding compositions to provide antistatic properties.

A totally unexpected advantage of the above-named group of additives was discovered during molding tests of material prepared in accordance with this invention. It was found that the additives disclosed hereinafter improved flow properties of the base plastic so as to permit shorter molding cycles as well as improved filling of thin mold sections; reduced breakage of thin-walled moldings and easier mold release were obtained.

An object of this invention is, therefore, to provide a method for eliminating the formation of electrostatic charges on molded plastic articles.

Another object is to provide a plastic molding composition having improved molding properties.

Still another object is to provide a plastic molding composition having preferred flow properties when injection molded.

A particular object is to provide a plastic material which is substantially non-susceptible to acquiring electrostatic charges.

A particular object of this invention is to provide a method for eliminating the formation of electrostatic charges on molded plastic articles during and especially immediately after the molding operation.

Another object is to provide articles comprising polystyrene compositions which are free of the effects of electrostatic charges.

Still another object of this invention is to provide an improved plastic composition, and methods of making same.

A still different object is to reduce the electrostatic charge on polystyrene objects made by injection moldings.

A further object of this invention is to provide a polystyrene composition of superior molding properties.

Further objects and advantages will become apparent and still others will be pointed out with particularity as the following detailed description proceeds.

We have found that totally and partially carboxyalkylated alkylene polyamines when incorporated in resinous polymer molding compositions impart highly desirable antistatic properties.

By way of example, and not limited thereto, are the following diamines:

Mono-carboxyalkylated alkylene diamine
Di-carboxyalkylated alkylene diamine
Tri-carboxyalkylated alkylene diamine, and
Tetra- or totally-carboxyalkylated alkylene diamine The chemical structures may be represented as follows:

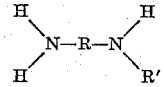

which is mono-carboxyalkylated alkylene diamine,

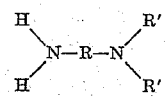

or

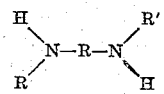

which is di-carboxyalkylated alkylene diamine,

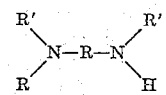

which is tri-carboxyalkylated alkylene diamine, and

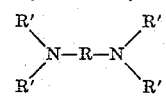

which is totally carboxyalkylated alkylene diamine, wherein: R is an alkylene radical containing from 2 to 6 carbon atoms and R' is a carboxyalkyl group containing from 2 to 8 carbon atoms.

Also among the usable carboxyalkylated polyamines are the partially or totally carboxyalkylated polyethylene polyamines.

The usable carboxyalkylated polyamines are characterized by the fact that the carboxyalkyl groups shall contain from 2 to 8 carbon atoms, alkylene groups connecting nitrogen atoms in the polyamines shall contain from 2 to 6 carbon atoms, and that the polyamines shall contain no more than 5 amine nitrogen atoms.

The preferred carboxyalkylated polyamines are the totally carboxyalkylated polyamines and more specifically the totally carboxymethylated and carboxyethylated alkylene diamines.

It is within the scope of this invention to employ different carboxyalkyl groups within a given compound.

The quaternary ammonium compounds resulting from the reaction of the carboxyalkylated polyamines with alkyl or alkyl-aryl halides or salts may be employed for the purposes of this invention. This is also true of the acid salts resulting from reacting the carboxyalkylated polyamines with acids.

It is within the scope of this invention to employ compounds characterized by the esterification, with an alkyl group containing not more than 4 carbon atoms, of carboxyalkylated polyamines, their acid salts and quaternary compounds produced by reaction with alkyl or alkyl-aryl salts. Alkali metal, amine and ammonium salts of the carboxyalkylated polyamines may likewise be used. The alkali metal salts of totally carboxymethylated ethylene diamine are especially suitable for the purposes of this invention.

It has been discovered in the course of experimentation with materials of the type described above that certain polyamines substituted with short chain acid groups in the N-position tend to cause puffing or the formation of blow-holes during extrusion or molding. The permissible chain length is dependent on the degree of substitution in a manner which cannot be simply stated except to say that longer chains are not excluded as the degree of substitution is decreased. The situation is adequately covered if only those carboxyalkylated polyamines having a vapor pressure less than 760 mm. at 225° C. are used. If more volatile compounds are used, gassing during extrusion or molding becomes objectionable.

While additives having the above described tendency to gas are obviously undesirable in compositions which are to be handled at high temperatures, such materials can be used to make up a minor proportion of the total additive when used in combination with preferred additives.

By incorporating any of the above mentioned additives or mixtures thereof in polystyrene or other resinous polymers the destaticizing properties are attained without incurring any of the undesirable features enumerated above. The quantity of additive employed is between 1 and 5% by weight based on the total product and preferably between 2 and 4%.

Be it observed that it will often be advantageous to prepare a master-batch of resin with incorporated additive, said master-batch containing far more additive than is recomended for use in molding operations, and being later cut back by extrusion or by being otherwise blended with untreated resin. Such a concentrate may well be sold, particularly in the "clear" or "natural" color for blending with untreated resin of various colors of its own color. The master-batch may contain up to 50% of the additive.

By way of illustration, there are given hereinafter a number of examples wherein the additive, quantity of additive and the resinous polymer employed are varied. Since hundreds of combinations are possible it becomes impractical to show more than a few typical compositions with additives so selected from the described group as to show operability of the group as a whole and therefore such examples shall not be regarded as limiting in any sense.

Where it is desired to prepare a master-batch or to market a concentrated blending material, the procedures of Examples 10 and 12 are preferred. In plants where mass polymerization is employed the procedures of Examples 11 and 12 will be especially useful.

In cases where plastic chip is to be treated or where the polymerization methods in use are not adapted to taking advantage of the processes mentioned above, the process of Example 7 is preferred for its simplicity and freedom from extra drying steps.

Where it is desired to incorporate pigment in the plastic as well as to render it antistatic the processes of Examples 1 and 2 are preferred. This procedure is claimed in our copending application entitled "Process for Making Plastic Compositions," Serial No. 532,132, filed September 2, 1955.

In carrying out this last referred to process, the additive is dissolved in a solvent which is a non-solvent for the plastics employed. The solution and plastic in comminuted form are then mixed together. The solvent is then removed so as to deposit the additive over the plastic particles.

In accordance with a particular example of this last mentioned procedure, from 0.1 to 0.5 pound of the additive is dissolved in one pound of isopropyl alcohol. Sufficient comminuted resinous polymer to make a total of ten pounds of additive plus polymer is mixed with the solution. The alcohol is then evaporated in an exhaust oven at 65° C. for 36 hours with occasional agitation, so as to leave the polymer granules uniformly coated with said additive.

The coated material is then fed through a Windsor type RC-65 twin-screw extruder equipped with a series of ⅛" square orifices. The die and barrel are maintained at a suitable temperature for the particular polymer, such as 400° F. for polystyrene. The extruded material may then be chopped up into molding granules.

The molding granules may then be injection molded, as for example on a Reed-Prentice 8-ounce injection molding press with a heater temperature of 550° F. for polystyrene.

As a test of the effectiveness of the additive the resulting articles may be promptly sprayed with fine bentonite dust by means of a hand sprayer. The dust will collect in patterns on charged areas. Additional moldings may be set aside and observed periodically for several weeks. Using a Keithley electrostatic voltmeter, the potential may be measured between the molding and ground immediately after withdrawal from the mold.

As a control means identical articles may be molded from the same polymer not using the additive.

*Example 1*

The foregoing procedure was carried out using the following composition:

| | Lb. |
|---|---|
| Totally carboxymethylated ethylene diamine (mfrd. by Glyco Products Company) under trademark "Tetrine Acid" | 0.3 |
| Polystyrene granules, 10–60 mesh (Monsanto Chemical Co., L2020 PIX-6) | 9.7 |
| Total | 10.0 |

The dust test showed the absence of charged areas. The electrostatic voltmeter reading was about one volt.

One control article was sprayed with the bentonite dust immediately after molding and a well defined "fern-like" pattern was immediately apparent. The same control article yielded a 20 volt reading on the electrostatic voltmeter upon removal from the mold. After long term storage another unmodified polystyrene molding showed definite dust patterns whereas the modified polystyrene article showed but a few isolated gravity deposited grains.

The molding characteristics of the modified polystyrene were judged to be superior to that of the control or unmodified polystyrene by the molding machine operator on the basis of obviously improved ease of mold release and lower breakage of thin-walled moldings.

Example 2

The procedure of Example 1 was repeated with the exception that 0.1 gram of phthalocyanine blue was suspended in the alcohol and put through a colloid mill together with the additive prior to incorporation into the polystyrene. The resulting molded product was a uniform attractive blue color.

When tested as in Example 1, the molding and destaticizing characteristics were found to be identical to the treated product of Example 1.

Example 3

Example 1 was repeated with the same additive in a concentration of 1% by weight of the total product. The resulting molding exhibited poor non-electrostatic properties, as measured by the Keithley voltmeter. A small amount of dust was collected in patterns after storage for two weeks. There was an improvement shown over the performance of the unmodified control specimen.

Example 4

Example 1 was repeated using 0.5 pound of the same additive and 9.5 pounds of polystyrene. A slight improvement in destaticizing properties was noted.

Example 5

2.0 pounds of isopropyl alcohol and 0.5 pound of the sodium salt of totally carboxymethylated ethylene diamine were mixed together to form a solution of watery consistency. The foregoing mixture was worked in a sigma blade mixer, with 9.5 pounds of polystyrene. After 15 minutes the particles were found to be coated with the additive. The coated particles were then dried at 65° C. for 24 hours to remove the alcohol. The coated particles were then put through the extruder, chopped and molded as in Example 1. The resulting products showed substantially the same properties as the modified compositions of Example 1.

Example 6

0.4 pound of tricarboxypropylated propylene amine ethyl ammonium chloride and 9.6 pounds of polystyrene granules as used in Example 1 were thoroughly mixed in a sigma blade mixer. The mixture was then extruded, chopped and molded as in Example 1. The molded articles showed no discernible electrostatic charge as measured on the Keithley meter. The molded articles showed no tendency to collect dust in patterns during a 30 day storage test.

Example 7

Example 1 was repeated using as the additive 0.4 pound of diisopropyl ester of tetracarboxybutylated hexylene diamine and 9.6 pounds of the polystyrene. The results were comparable.

Example 8

The procedure of Example 6 was repeated using 9.6 pounds of a so-called high impact polystyrene which was a plastic alloy of 85% polystyrene, 5% polybutadiene, 10% polyacrylonitrile and 0.4 pound of dicarboxypropylated ethylene diamine.

The molded product was compared with a control specimen prepared in identical fashion with the exception that the additive was omitted. The two specimens were opaque in appearance. Immediately after molding the treated material showed a charge of one volt whereas the unmodified control showed a charge of nineteen volts.

Example 9

40 grams of totally carboxypropylated propylene diamine dissolved in 60 grams of water, were incorporated into 666 grams of polystyrene emulsion containing 30% polystyrene solids.

760 grams of granulated polystyrene were placed in a Baker-Perkins mixer. With the mixer in operation, the polystyrene emulsion additive mixture was slowly added. The resultant slurry was then dried at 65° C. for 48 hours at which time it was found to be water-free. The resultant mixture which contained 4% of the additive, when molded as in Example 1, yielded moldings which when tested as in Example 1, exhibited destaticized characteristics similar to the modified product of Example 1.

Example 10

40 grams of pentacarboxymethylated diethylene triamine dissolved in 40 grams of water were added to 400 grams of a 30% solids polystyrene emulsion. This mixture was spray-dried and gave a free flowing polystyrene powder containing one part of the additive to three parts of polystyrene. The resultant concentrate was tumbled with 840 grams of a granulated polystyrene. The resultant blend was injection molded under conventional polystyrene molding conditions and yielded destaticized moldings having properties comparable to those produced by the procedures of Example 1.

Example 11

2.4 grams of $\alpha,\alpha'$ azodiisobutyronitrile was dissolved in 960 grams of monomeric styrene, 40 grams of finely divided dicarboxypropylated ethylene diamine were suspended in the styrene and the suspension was placed in a heated agitated reaction kettle into which nitrogen was bubbled. The styrene suspension was heated at 70° C. for 1½ hours until an exothermic reaction took place. The reaction was continued for an additional 30 minutes with the temperature being gradually increased to 90° C. until considerable polymerization took place, as evidenced by an increase in viscosity. The mixture was transferred to air-free containers which were then sealed. The containers were maintained at a temperature of 90° C. for 48 hours. The resultant polymer was extruded, chopped and injection molded under normal polystyrene molding conditions. Moldings were clean and when rubbed with a wool cloth they would not become electrostatically charged as does unmodified polystyrene when so rubbed.

Example 12

2.0 grams of $\alpha,\alpha$-azodiisobutyronitrile was dissolved in 800 grams of monomeric styrene, 200 grams of finely divided dicarboxymethylated ethylene diamine were suspended in the styrene and the suspension was placed in a heated agitated reaction kettle into which nitrogen was bubbled. The suspension was heated at 70° C. for 1½ hours until an exothermic reaction took place. The reaction was continued for an additional 30 minutes with the temperature being gradually increased to 90° C. Considerable polymerization took place as evidenced by an increase in viscosity. The mixture was transferred to air-free containers which were then sealed. The containers were held at 90° C. for 48 hours. The resultant polymer was extruded and chopped into granules. Later, 200 grams of the resulting granules were mixed with 800 grams of untreated polystyrene granules, extruded, chopped and injection molded under normal polystyrene molding conditions. The resulting moldings were similar in quality to those made in Example 1.

By "plastic alloy" as used herein we intend to encompass compositions comprising two or more types of polymeric molecules whether prepared by copolymerization or by intimate mixing.

Mixtures of the various additives may be employed providing the total amount is within the disclosed proportions for a single specie.

While we have disclosed what is at present considered the best mode for carrying out our invention, we appreciate that it will be obvious to those skilled in the art that various changes and modifications may be made therein without departing from the invention, and it is, therefore, aimed in the appended claims to cover all such changes and modifications as fall within the true spirit and scope of the invention.

This application is a continuation in part of our co-pending application entitled "Non-Electrostatic Molding Compositions," Serial No. 556,402, filed Dec. 30, 1955, and abandoned in favor of the present application.

What we claim is:

1. A composition of matter comprising polystyrene and between 1% and 50% by weight of an additive from the group consisting of carboxylated polyamines containing from 2 to 6 carbon atoms in the alkylene groups connecting the amine nitrogen atoms, from 2 to 8 carbon atoms in the carboxyalkyl groups and no more than five amine nitrogen atoms, and alkali metal and quaternary ammonium salts of said polyamines.

2. The composition of claim 1 wherein the additive is a carboxyalkylated polyamine.

3. A composition of matter comprising polystyrene and from 3% to 5% by weight of the polystyrene, of a destaticizing agent consisting of a compound selected from the group consisting of carboxylated polyamines containing from 2 to 6 carbon atoms in the alkylene groups connecting the amine nitrogens, from 2 to 8 carbon atoms in the carboxyalkyl groups and no more than five amine nitrogen atoms; and alkali metal and quaternary ammonium salts of said polyamines.

4. A composition of matter comprising polystyrene and between 1% and 5% by weight of a destaticizing agent consisting of a carboxyalkylated polyamine containing from 2 to 6 carbon atoms in the alkylene groups connecting the amine nitrogen atoms, from 2 to 8 carbon atoms in the carboxyalkyl groups and no more than five amine nitrogen atoms.

References Cited in the file of this patent
UNITED STATES PATENTS

| | | |
|---|---|---|
| 2,413,857 | Bersworth et al. | Jan. 7, 1947 |
| 2,558,728 | Britton et al. | July 3, 1951 |

OTHER REFERENCES

Schildknecht: Vinyl and Related Polymers, John Wiley & Sons, Inc., New York, 1952, pages 86–118.

Bovey et al.: Emulsion Polymerization, Interscience Publishers, Inc., 1955 (chapter XI), pages 359–405.

UNITED STATES PATENT OFFICE

CERTIFICATE OF CORRECTION

Patent No. 2,922,771                                      January 26, 1960

Myron A. Coler et al.

It is hereby certified that error appears in the printed specification of the above numbered patent requiring correction and that the said Letters Patent should read as corrected below.

Column 3, line 40, for "undersirable" read -- undesirable --; column 7, lines 10 and 21, for "carboxylated", each occurrence, read -- carboxyalkylated --.

Signed and sealed this 9th day of August 1960.

(SEAL)
Attest:

KARL H. AXLINE
Attesting Officer

ROBERT C. WATSON
Commissioner of Patents